(12) United States Patent
Dalsgaard et al.

(10) Patent No.: US 9,699,608 B2
(45) Date of Patent: Jul. 4, 2017

(54) METHOD AND APPARATUS FOR IMPROVED SIGNALING

(75) Inventors: Lars Dalsgaard, Oulu (FI); Jarkko Koskela, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 605 days.

(21) Appl. No.: 14/234,995

(22) PCT Filed: Aug. 4, 2011

(86) PCT No.: PCT/FI2011/050685
§ 371 (c)(1),
(2), (4) Date: Jan. 24, 2014

(87) PCT Pub. No.: WO2013/017729
PCT Pub. Date: Feb. 7, 2013

(65) Prior Publication Data
US 2014/0171125 A1   Jun. 19, 2014

(51) Int. Cl.
*H04W 40/00* (2009.01)
*H04W 4/02* (2009.01)
(Continued)

(52) U.S. Cl.
CPC ....... *H04W 4/023* (2013.01); *H04W 36/0083* (2013.01); *H04W 64/00* (2013.01);
(Continued)

(58) Field of Classification Search
CPC ... H04W 84/045; H04W 48/16; H04W 24/10; H04W 36/0061; H04W 36/30; H04W 48/02; H04W 4/08; H04W 84/105
(Continued)

(56) References Cited

U.S. PATENT DOCUMENTS

2010/0323633 A1   12/2010   Pani et al.
2011/0143738 A1*   6/2011   Kone ............... H04W 48/16
                                                          455/418
(Continued)

FOREIGN PATENT DOCUMENTS

EP   2328375   6/2011
EP   2343924   7/2011
(Continued)

OTHER PUBLICATIONS

International Search Report for corresponding Patent Cooperation Treaty Application No. PCT/FI2011/050685, dated May 16, 2012, 4 pages.
(Continued)

Primary Examiner — Charles Appiah
Assistant Examiner — Jaime Holliday
(74) Attorney, Agent, or Firm — Seppo Laine Oy

(57) ABSTRACT

In accordance with an example embodiment of the present invention, there is provided an apparatus comprising a receiver configured to receive a measurement instruction comprising an indication of a first frequency, and at least one processing core configured to suppress causing sending of a proximity indication relating to a closed subscriber group cell operating substantially on at least the first frequency. In some embodiments, sending of redundant proximity indications may thus be avoided.

12 Claims, 4 Drawing Sheets

(51) Int. Cl.
*H04W 64/00* (2009.01)
*H04W 84/10* (2009.01)
*H04W 36/30* (2009.01)
*H04W 36/00* (2009.01)
*H04W 48/02* (2009.01)
*H04W 48/16* (2009.01)
*H04W 4/08* (2009.01)
*H04W 24/10* (2009.01)
*H04W 36/32* (2009.01)
*H04W 84/04* (2009.01)

(52) U.S. Cl.
CPC .............. *H04W 4/08* (2013.01); *H04W 24/10* (2013.01); *H04W 36/0061* (2013.01); *H04W 36/30* (2013.01); *H04W 36/32* (2013.01); *H04W 48/02* (2013.01); *H04W 48/16* (2013.01); *H04W 84/045* (2013.01); *H04W 84/105* (2013.01)

(58) Field of Classification Search
USPC ...................................... 455/422.1, 443, 448
See application file for complete search history.

(56) References Cited

U.S. PATENT DOCUMENTS

2012/0263064 A1* 10/2012 Iwamura ........... H04W 36/0083
370/252
2012/0289274 A1* 11/2012 Matsuo ................ H04W 48/02
455/509

FOREIGN PATENT DOCUMENTS

WO 2011041748 4/2011
WO 2011085204 7/2011

OTHER PUBLICATIONS

Written Opinion for corresponding Patent Cooperation Treaty Application No. PCT/FI2011/050685, dated May 16, 2012, 7 pages.

* cited by examiner

310 — Receiving a measurement instruction comprising an indication of a first frequency 320 — Suppressing the sending of a proximity indication relating to a closed subscriber group cell operating on at least the first frequency

FIGURE 3

METHOD AND APPARATUS FOR IMPROVED SIGNALING

RELATED APPLICATION

This application was originally filed as PCT Application No. PCT/FI2011/050685filed Aug. 4, 2011.

TECHNICAL FIELD

The present application relates generally to providing improved signaling efficiency in heterogenous networks.

BACKGROUND

Cellular communication networks, or cellular networks, comprise a large number of cells which are integrated to form the network. A cellular network may span an entire country, in which case it may be referred to as a countrywide network. Cellular networks provide large-area roaming, allowing users to move about large areas with continuous access to the network. This makes possible, for example, for a consumer to remain connected to a single voice call or data connection while traversing a country by train or car.

Networks with smaller geographical reach may be referred to as local networks. Whereas local networks may not be able to offer the geographic reach of cellular networks, especially nationwide cellular networks, they may offer a high datarate in a more limited area where large numbers of customers need connectivity. One example of a local network is a wireless local area network, WLAN, access point. Another is a femtocell, by which is meant a cellular cell of limited range.

Femtocells, or in general cells with smaller cells, may be deployed for various reasons. Historically smaller cells have been used to increase network capacity by allowing frequencies to be re-used to a higher degree over a given geographic area. A large cell allows for a set of frequencies to be used only once, which limits capacity. By splitting a large cell into smaller ones, the same set of frequencies may be used more than once, allowing a network operator to serve a larger number of subscribers in the same area and by using the same frequency band. Other names for smaller cells include picocells which may be seen as larger than femtocells, and microcells which in turn may be seen as larger than picocells.

Smaller cells may also be used where transmission power limits don't allow installing a cell of larger radius. This is due to the fact that a base station serving a large cell must transmit to the edge of the large cell, which is farther away than an edge of a smaller cell.

Another reason for using smaller cells is to allow a limited subset of subscribers to access an alternative cell, which may be comprised in a larger network that is open to a larger set of subscribers. Such a cell may be known as a closed subscriber group, CSG, cell. To define a CSG cell, a corresponding set of subscribers that have access to the cell may be defined. A CSG cell may be considered to be a special type of femto- pico- or microcell, for example.

SUMMARY

Various aspects of examples of the invention are set out in the claims.

According to a first aspect of the present invention, there is provided an apparatus comprising a receiver configured to receive a measurement instruction comprising an indication of a first frequency, and at least one processing core configured to suppress sending of a proximity indication relating to a closed subscriber group cell operating substantially on at least the first frequency.

According to a second aspect of the present invention, there is provided a method, comprising receiving a measurement instruction comprising an indication of a first frequency, and suppressing the sending of a proximity indication relating to a closed subscriber group cell operating substantially on at least the first frequency.

According to a third aspect of the present invention, there is provided an apparatus, comprising at least one processor, at least one memory including computer program code, the at least one memory and the computer program code configured to, with the at least one processor, cause the apparatus to at least receive an instruction instructing the apparatus to transmit proximity indications, wherein the instruction comprises a list comprising at least one indication of frequency, and transmit at least one proximity indication in dependence of the at least one indication of frequency.

According to a fourth aspect of the present invention, there is provided an apparatus, comprising at least one processor, at least one memory including computer program code, the at least one memory and the computer program code configured to, with the at least one processor, cause the apparatus to at least transmit an instruction instructing a mobile apparatus to transmit proximity indications, wherein the instruction comprises a list comprising at least one indication of frequency.

According to further aspects of the invention, computer program products and computer programs are provided, the computer program products and computer programs being configured to cause methods according to aspects of the invention to be performed.

BRIEF DESCRIPTION OF THE DRAWINGS

For a more complete understanding of example embodiments of the present invention, reference is now made to the following descriptions taken in connection with the accompanying drawings in which:

FIG. 3 is a flow diagram showing operations for a method according to an example embodiment of the invention.

DETAILED DESCRIPTION OF THE DRAWINGS

An example embodiment of the present invention and its potential advantages are understood by referring to FIGS. 1 through 4 of the drawings.

Figure 1:
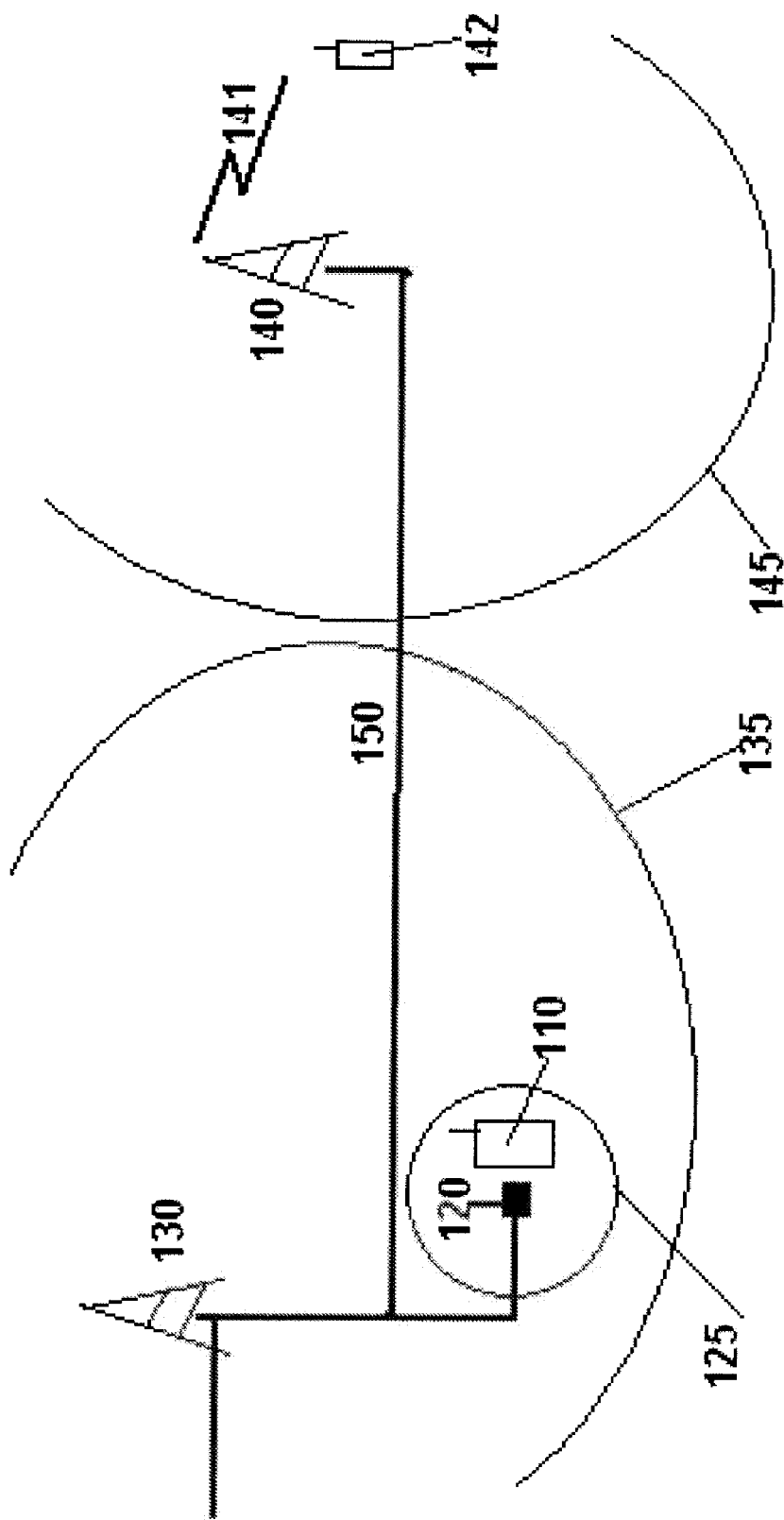
FIG. 1 illustrates an example system capable of supporting some embodiments of the invention.

FIG. 1 illustrates an example system capable of supporting some embodiments of the invention. The system comprises mobile 110, which may be a cellular telephone, personal digital assistant, PDA, cellular telephone, tablet computer or another kind of device, for example. Base stations 130 and 140 may be configured to operate according to at least one cellular standard, such as global system for mobile communication, GSM, wideband code division multiple access, WCDMA or long term evolution, LTE, for example. Base station 120 may be considered to control a cell of its own. Base stations 130 and 140 may be configured to communicate using a pre-defined band of licensed spectrum, which has been allocated by authorities for cellular communication. Base station 120 may operate according to wireless local area network, WLAN, or worldwide interoperability for microwave access, WiMAX, technologies, for example, or according to a cellular standard like cells 135 and 145, which are controlled by base stations 130 and 140, respectively. Base station 120 may be configured to control a CSG cell 125. CSG cell 125 may be considered to be a smaller cell when compared to cells 135 and 145. In some embodiments, base station 120 is a mobile device. CSG cell 125 may be comprised in the same network as cells 135 and 145.

Mobiles may roam from location to location, and depending on measurements, such as for example measurements of signal strength between mobile and base station, mobiles may change from communicating with a first base station, such as base station 130, to communicating with another base station, such as base station 140. Such a change may be known as a handover. In one form of handover, known as soft handover, a mobile may change from communicating with base station 130 only to communicating with base station 130 and base station 140, for example. A set of base stations with which a mobile communicates simultaneously may be known as an active set.

CSG cell 125 may be configured to provide additional coverage for a subset of users, such as premium users. CSG cell 125 may be configured to provide services that are not available in other cells, such as cells 135 and 145. CSG cell 125 may provide a location estimate to users allowed to attach to it since CSG cell 125 may be a relatively small cell. Calls and connections from CSG cell 125 may be given preferential access to taxi centres, service numbers and/or intranet/extranet accesses.

Mobile 110 may be capable of communicating with at least one cellular protocol used by base stations 120, 130 and/or 140. FIG. 1 illustrates further mobile 142 in wireless communication with base station 140. Wireless link 141 interconnects further mobile 142 and base station 140. Wireless link 141 may comprise a downlink for conveying information from base station 140 to further mobile 142. Wireless link 141 may comprise an uplink for conveying information from further mobile 142 to base station 140. Wireless link 141 may conform to a cellular communication standard, for example. Wireless link 141 may be based on GSM, WCDMA, LTE or another standard. Wireless link 141 may be based on orthogonal frequency division multiple access, OFDMA, code division multiple access, CDMA, time divisions multiple access, TDMA, or a combination of these, for example. Wireless links between mobiles and base stations 130 and 120 may be substantially similar to wireless link 141.

Base stations 120, 130 and 140 are in the example system of FIG. 1 interconnected by a backbone network 150. Backbone network 150 may be further connected to other parts of the cellular network in which base stations 120, 130 and 140 are comprised. The cellular network may comprise in addition to base stations various nodes such as switches, mobility management entities, MMEs, serving gateways, SGWs, base station controllers and the like, depending on the embodiment and type of network.

Mobile 110 may be configured by the network to store an identifier of CSG cell 125. Mobile 110 may responsively be configured to store the CSG cell identifier into a list stored in mobile 110. The list may be known as a whitelist, which comprises identifiers of CSG cells to which mobile 110 has access rights. The network may also configure mobile 110 to transmit proximity indications to the network when mobile 110 finds itself in the vicinity of a CSG cell the identifier of which is comprised in the whitelist of mobile 110. Mobile 110 may transmit proximity indications to the base station or base stations to which it is attached, which may be for example base station 130 or base station 140. The network may in some embodiments configure mobile 110 to transmit proximity indications at a set interval, for example 5 seconds, when mobile 110 is in the proximity of at least one CSG cell whose identity is in the whitelist of mobile 110. The network may configure the interval to be longer in areas where mobility is low, for example, and since if mobiles don't move very fast their proximity information won't change very quickly. The interval may be informed to mobile 110 in the same message the network uses to configure mobile 110 to transmit proximity indications. The network may update the interval using separate signaling messages. Proximity indications sent by mobiles toward the network may comprise information identifying the CSG cell, such as CSG id. The proximity indications may alternatively or additionally comprise a channel number of the CSG cell the proximity indicator relates to, for example an absolute radio frequency number, ARFCN.

Responsive to receiving a proximity indication relating to a cell on a whitelist from mobile 110, the network may instruct mobile 110 to measure a frequency used by the CSG cell. Where measurement reveals that a handover to the CSG cell is feasible, the network may instruct mobile 110 to handover to the CSG cell and continue communication at least in part via the CSG cell. Alternatively or additionally, responsive to proximity indications from mobiles, the network may initiate handover procedures to switch mobiles to CSG cells they have access rights to.

Mobile 110 may be configured to determine whether it is located in a fingerprint area, which may be defined in mobile 110 as a combination of characteristics of surrounding cells and/or geographic coordinates. Mobile 110 may determine its geographic coordinates using satellite positioning, for example. Mobile 110 may determine characteristics of cells from cell identities obtainable over broadcast channels or operational frequencies, for example. Mobile 110 may be furnished with information that whitelisted CSG cells are to be found in an area defined by at least one such fingerprint. Mobile 110 may be configured to search for whitelisted CSG cells responsive to determining it is in a fingerprint area.

When mobile 110 detects that it is leaving the proximity of a CSG cell, it may be configured to transmit to the network a proximity indication of type "leaving". The network may responsively refrain from instructing mobile 110 to measure for the CSG cell, since it is no longer in proximity.

The network may instruct mobile 110 to perform measurements regardless of the presence of CSG cells. Since in a normal case the network may request mobile 110 to measure a frequency related to a CSG cell regarding which mobile 110 has sent a proximity indication, it may be unnecessary for mobile 110 to transmit a proximity indication concerning a CSG cell if the network has already instructed mobile 110 to perform measurements on its frequency. In other words, since the network has already instructed mobile 110 to perform a measurement, it may be unnecessary for mobile 110 to transmit a proximity indication to prompt the network to instruct a similar measurement as is already in progress.

In some embodiments of the invention, mobile 110 is configured to only send proximity indications toward the network for CSG cells when no measurement has been configured by the network on the related frequency. This way the signaling level in the cellular network can be controlled, which has the benefit of conserving not only battery resources of mobile 110, but also communication resources in the network, and in code division multiple access, CDMA, type networks also battery resources in other mobiles, such as further mobile 142, since interference levels will be lower due to fewer proximity indications being transmitted over the air interface.

In some embodiments of the invention, the network may configure mobile 110 to send proximity indications concerning CSG cells on some frequencies, or to refrain from sending proximity indications concerning CSG cells on some frequencies. In other words, the network may provide mobile 110 a list of frequencies, the frequencies on the list relating to CSG cells concerning which proximity indications are to be sent, or alternatively to be suppressed. The frequencies may relate to CSG cells by virtue of being frequencies on which the CSG cells operate, for example. The frequencies may be indicated by indicating frequencies directly, or by indicating carriers, channel numbers or other indications understandable by mobile 110. An example channel number is an E-ARFCN.

An apparatus, such as for example mobile 110, may comprise a receiver configured to receive a measurement instruction, the instruction comprising an indication of a first frequency. For example, the network may transmit to mobile 110 a radio resource control, RRC, message telling mobile 110 to perform a measurement on a given frequency and/or radio-access technology, RAT. The frequency may be identified as a carrier, frequency channel number or another notation that mobile 110 is capable of understanding. Responsive to receiving the instruction, mobile 110 may be configured to perform the measurement, which may comprise for example determining whether there is radio-frequency energy on the first frequency, in some embodiments using a spreading code also identified in the measurement instruction.

Where mobile 110 after receiving the measurement instruction enters or leaves the proximity of a CSG cell that is in the whitelist of mobile 110, mobile 110 may be configured to suppress sending a proximity indication it would otherwise send. Mobile 110 may be so configured as a default factory setting, or alternatively the network may configure mobile 110 over the air using a signaling message. Since the network would be likely to issue a measurement instruction similar to the one mobile 110 has already received, a proximity indication in this case would likely serve no purpose.

In some embodiments, the network may configure mobile 110 to send proximity indications by transmitting an instruction. The instruction may take the form of an information element in a signaling message, such as for example an OtherConfig information element comprising a reportProximityIndication parameter, which may instruct mobile 110 whether to send proximity indications on a per-RAT and/or per-carrier basis. Considering whether a measurement on the relevant frequency is already configured in some embodiments of the invention overrides network configuration to send proximity indications. In other words, a mobile may suppress sending a proximity indication when a measurement on a relevant frequency is already configured, even if the network has configured mobile 110 to send proximity indications.

Mobile 110 may be configured to determine whether it is in a fingerprint area defined by at least one fingerprint stored in mobile 110. Depending on the embodiment, mobile 110 may deactivate CSG cell search routines responsive to determining mobile 110 isn't in a fingerprint area of mobile 110. Depending on the embodiment, mobile 110 may activate CSG cell search routines responsive to determining mobile 110 is in a fingerprint area of mobile 110. Responsive to changes in a subscription level of the subscriber, the network may update fingerprint information in mobile 110. Responsive to changes in a subscription level, or more generally subscription information, of the subscriber, the network may update the CSG cell whitelist in mobile 110.

In some embodiments of the invention, suppressing sending a proximity indication comprises not running CSG cell search routines concerning the first frequency.

In some embodiments, mobile 110 is configured to determine that it is in the proximity of, meaning physically close to, a CSG cell. Mobile 110 may then be configured to determine whether a second frequency, used by the detected CSG cell, is substantially the same as the first frequency. In case the first and second frequencies are substantially the same, mobile 110 is already configured by the network to perform a measurement on the frequency of the CSG cell and mobile 110 may be configured responsively to suppress sending a proximity indication to the network, even if the network would previously have requested proximity indications to be sent. In case the first and second frequencies are not substantially the same, meaning that mobile 110 hasn't been configured to measure the channel or carrier of the detected CSG cell, mobile 110 may be configured to proceed to transmit a proximity indication to the network concerning the detected CSG cell. In this context, substantially on the same frequency means that the frequencies are configured to be the same with any differences being insubstantial with regard to the operation of the apparatuses.

In some embodiments, mobile 110 is configured to first check whether an identity of the detected CSG cell is comprised in a whitelist stored in mobile 110 before determining whether the first and second frequencies are substantially the same. Alternatively mobile 110 may check whether an identity of the detected CSG cell is comprised in a whitelist stored in mobile 110 after determining whether the first and second frequencies are substantially the same. In some embodiments mobile 110 is configured to never send proximity indications concerning CSG cells that are not on the whitelist.

In some embodiments the network may configure mobile 110 to store a list of frequencies to control when mobile 110 is to send proximity indications. The list may comprise a list of frequencies, such that mobile 110 is not to send proximity indications relating to CSG cells operating substantially on frequencies comprised in the list. Alternatively, the list may define frequencies such that mobile 110 is to send proximity indications relating to CSG cells operating substantially on frequencies comprised in the list. Also in this case, mobile 110 may be configured to consider whether a detected CSG cell has an identity that is comprised on a whitelist of mobile 110, and only consider sending a proximity indication when the detected CSG cell has an identity that is comprised on a whitelist of mobile 110. The scope of the invention comprises also network apparatuses configured to send such instructions comprising a list of frequencies to mobile 110. Such network apparatuses may comprise for example base stations or core-network entities such as MMEs and SGWs. Such apparatuses may also receive proximity indications from mobile 110, possibly via other nodes such as base stations.

FIG. 3 is a flow diagram showing operations for a method according to an example embodiment of the invention. In phase 310, an apparatus such as mobile 110, for example, receives a measurement instruction comprising an indication of a first frequency. For example, a network may transmit to mobile 110 a radio resource control, RRC, message instructing mobile 110 to perform a measurement on at least one of a given frequency and a radio-access technology, RAT. The frequency may be identified as a carrier, frequency channel number, such as ARFCN, or another notation that mobile 110 is capable of understanding. Responsive to receiving the instruction, mobile 110 may be configured to perform the measurement, which may comprise for example determining whether there is radio-frequency energy on the first frequency, in some embodiments using a spreading code also identified in the measurement instruction. Identifying comprises also identifiably implying. The measurement may also comprise detecting a signature on a carrier comprised substantially on the first frequency.

In phase 320, the apparatus takes steps to suppress the sending of proximity indication messages relating to closed subscriber group cells that operate substantially on the first frequency. For example, the apparatus may cease searching for CSG cells that operate substantially the first frequency, or alternatively when detecting a CSG cell operating substantially on the first frequency, the apparatus may omit sending a proximity indication. The apparatus may omit sending a proximity indication even where an identity of the CSG cell is comprised on a whitelist of the apparatus and the network has instructed the apparatus to send proximity indication on the RAT the detected CSG cell uses.

Figure 4:
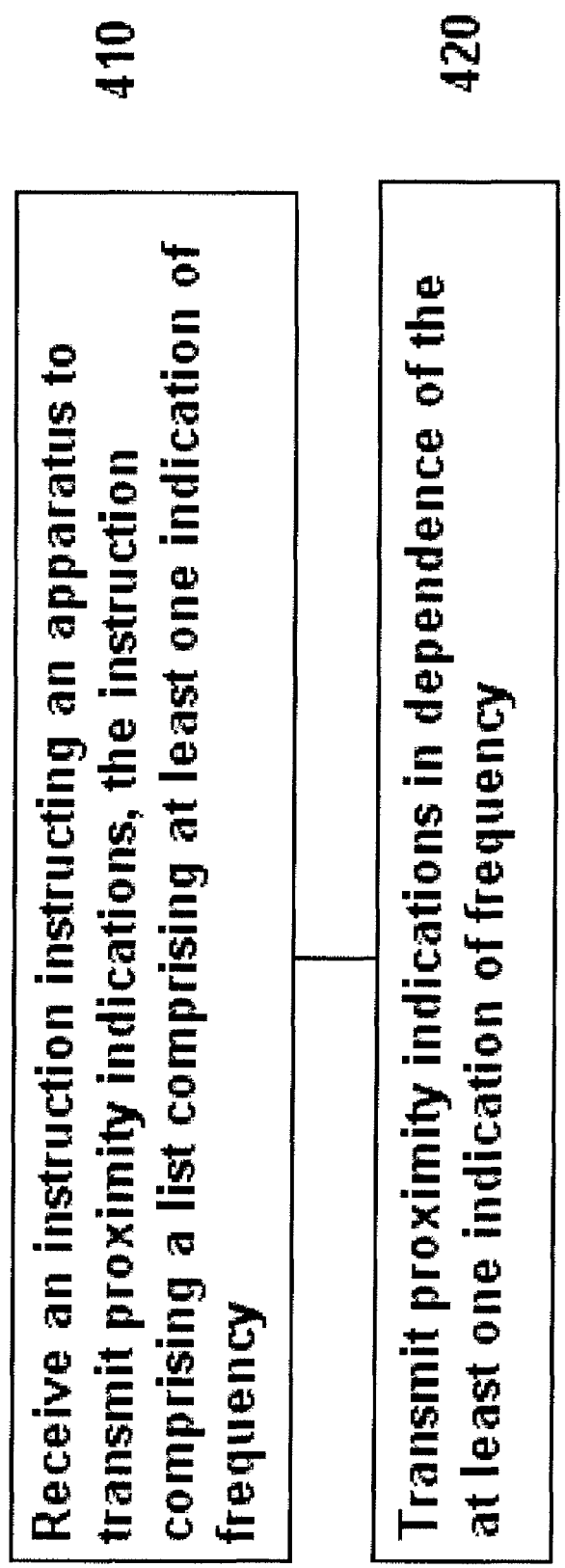
FIG. 4 is a flow diagram showing operations for a method according to an example embodiment of the invention.

FIG. 4 is a flow diagram showing operations for a method according to an example embodiment of the invention. In this embodiment in phase 410, an apparatus such as, for example, mobile 110 is configured to receive an instruction to transmit proximity indications, wherein the instruction comprises a list, wherein the list comprises at least one indication of frequency. The list may comprise a list of indications of frequencies, such that the apparatus is not to send proximity indications relating to CSG cells operating substantially on frequencies comprised in the list. Alternatively, the list may define frequencies such that the apparatus is to send proximity indications relating to CSG cells operating substantially on frequencies comprised in the list. Also in this case, the apparatus may be configured to consider whether a detected CSG cell has an identity that is comprised on a whitelist of the apparatus, and only consider sending a proximity indication when the detected CSG cell has an identity that is comprised on a whitelist of the apparatus. The at least one indication of frequency may be indirect, as long as the apparatus is capable of associating the at least one indication with an actual frequency or frequencies.

In phase 420, the apparatus is configured to act on the instruction and send proximity indications accordingly.

Figure 2:
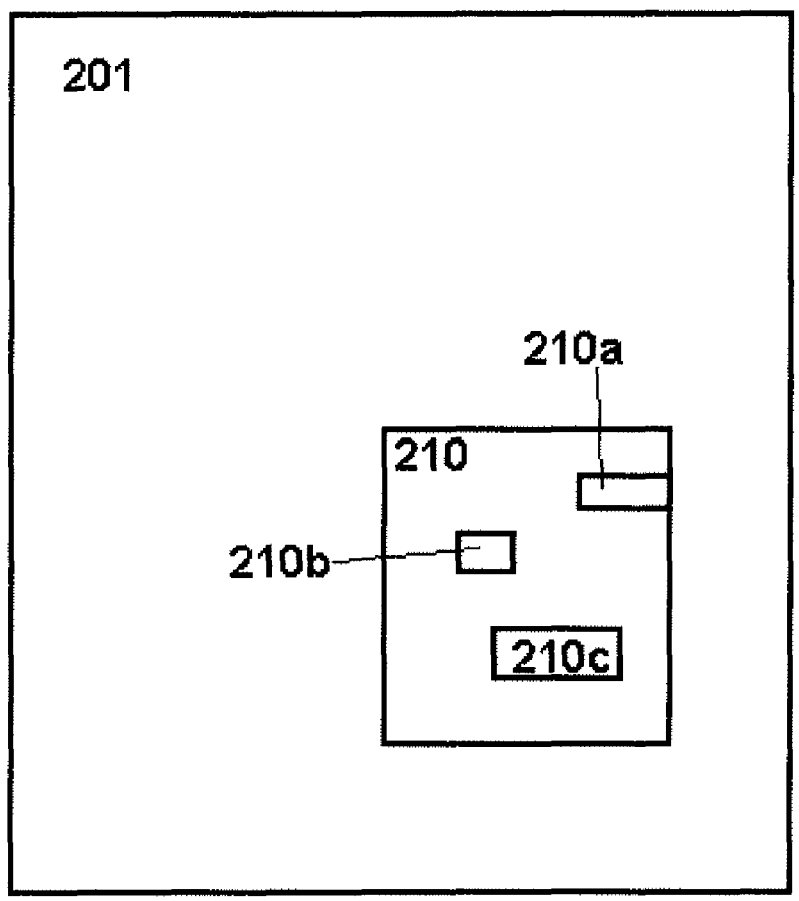
FIG. 2 illustrates an example apparatus 201 capable of supporting some embodiments of the present invention.

FIG. 2 illustrates an example apparatus 201 capable of supporting some embodiments of the present invention. The apparatus may correspond to mobile 110, or base station 120, for example. The apparatus is a physically tangible object, for example a mobile telephone, personal digital assistant, data dongle or a similar device. The apparatus may comprise a control apparatus 210, for example a digital signal processor, DSP, processor, field-programmable gate array, FPGA, application-specific integrated circuit, ASIC, chipset or controller. The apparatus may further comprise a transmitter and/or a receiver 210a configured to enable the apparatus 201 to connect to other apparatuses. A combination of transmitter and receiver may be called a transceiver. The apparatus may comprise memory 210b configured to store information, for example measurement configuration information. The memory may be solid-state memory, dynamic random access memory, DRAM, magnetic, holographic or other kind of memory. The apparatus may comprise logic circuitry 210c configured to access the memory 210b and control the transmitter and/or a receiver 210a. The logic circuitry 210c may be implemented as software, hardware or a combination of software and hardware. The logic circuitry may comprise a processing core. The logic circuitry 210c may execute program code stored in memory 210b to control the functioning of the apparatus 201 and cause it to perform functions related to embodiments of the invention. The logic circuitry 210c may be configured to initiate functions in the apparatus 201, for example the sending of data units via the transmitter and/or a receiver 210a. The logic circuitry 210c may be control circuitry. The transmitter and/or a receiver 210a, memory 210b and/or logic circuitry 210c may comprise hardware and/or software elements comprised in the control apparatus 210. Memory 210b may be comprised in the control apparatus 210, be external to it or be both external and internal to the control apparatus 210 such that the memory is split to an external part and an internal part. If the apparatus 201 does not comprise a control apparatus 210 the transmitter and/or a receiver 210a, memory 210b and logic circuitry 210c may be comprised in the apparatus as hardware elements such as integrated circuits or other electronic components. The same applies if the apparatus 201 does comprise a control apparatus 210 but some, or all, of the transmitter and/or a receiver 210a, memory 210b and logic circuitry 210c are not comprised in the control apparatus 210. In embodiments where apparatus 201 is a mobile user equipment, apparatus 201 may comprise at least one antenna Without in any way limiting the scope, interpretation, or application of the claims appearing below, a technical effect of one or more of the example embodiments disclosed herein is that signaling overhead is avoided since fewer redundant proximity indications may be sent. Another technical effect of one or more of the example embodiments disclosed herein is that the level of interference in a cellular system is reduced. Another technical effect of one or more of the example embodiments disclosed herein is that battery resources are conserved both due to fewer proximity indications being sent, and due to lower interference.

Embodiments of the present invention may be implemented in software, hardware, application logic or a combination of software, hardware and application logic. The software, application logic and/or hardware may reside on memory 210b, the control apparatus 210 or electronic components, for example. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable non-transitory storage medium that may be any media or means that can contain or store the instructions for use by or in connection with an instruction execution system, apparatus, or device, such as a computer. The scope of the invention comprises computer programs configured to cause methods according to embodiments of the invention to be performed.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
a receiver configured to receive a measurement instruction comprising an indication of a first frequency, and
at least one processing core configured to suppress, responsive to the measurement instruction, causing sending of a proximity indication relating to a closed subscriber group cell operating substantially on at least the first frequency, and
wherein the at least one processing core is further configured to determine whether the apparatus is located near a closed subscriber group cell, wherein the closed subscriber group cell communicates using at least a second frequency, the at least one processing core being further configured to determine whether the first frequency is substantially the same as the second frequency, and in case the first and second frequencies are not substantially the same, the at least one processing core is configured to cause a transmitter comprised in the apparatus to not suppress sending a proximity indication, and in case the first and second frequencies are substantially the same, the at least one processing core is configured to suppress causing sending of a proximity indication.

2. An apparatus according to claim 1, wherein the receiver is further configured to receive an instruction instructing the apparatus to transmit proximity indications.

3. An apparatus according to claim 1, wherein the apparatus is configured to determine whether it is located in a fingerprint area of the apparatus.

4. An apparatus according to claim 3, wherein the apparatus is configured to determine whether the apparatus is located near a closed subscriber group cell responsive to determining that the apparatus is located in a fingerprint area of the apparatus.

5. An apparatus according to claim 1, wherein suppressing causing sending of a proximity indication comprises suppressing searching for closed subscriber group cells operating substantially on the first frequency.

6. An apparatus according to claim 1, wherein the at least one processing core is configured to perform the determination whether the first frequency is substantially the same as the second frequency only in case an identity of the closed subscriber group cell is comprised in a list stored in the apparatus.

7. An apparatus according to claim 1, wherein the apparatus comprises a mobile communication device, the apparatus further comprising an antenna coupled to the receiver and configured to provide signals to the at least one processing core.

8. A method, comprising:
receiving a measurement instruction comprising an indication of a first frequency, and
suppressing, responsive to the measurement instruction, the sending of a proximity indication relating to a closed subscriber group cell operating substantially on at least the first frequency, and
determining whether an apparatus performing the method is near a closed subscriber group cell, wherein the closed subscriber group cell communicates using at least a second frequency, and determining whether the first frequency is substantially the same as the second frequency, and in case the first and second frequencies are not substantially the same, not suppress sending a proximity indication, or in case the first and second frequencies are substantially the same, to suppress sending of a proximity indication.

9. A method according to claim 8, further comprising receiving an instruction instructing the apparatus to transmit proximity indications.

10. A method according to claim 8, further comprising determining whether an apparatus performing the method is located in a fingerprint area of the apparatus.

11. A method according to claim 10, further comprising determining whether the apparatus is located near a closed subscriber group cell responsive to determining that the apparatus is located in a fingerprint area of the apparatus.

12. A method according claim 8, further comprising performing the determination whether the first frequency is substantially the same as the second frequency only in case an identity of the closed subscriber group cell is comprised in a list stored in the apparatus.

* * * * *